June 17, 1952 — N. S. RUTH — 2,600,518
SELF-LEVELING SUPPORTING DEVICE
Filed Aug. 18, 1948 — 2 SHEETS—SHEET 1

Norman S. Ruth
INVENTOR.

June 17, 1952      N. S. RUTH      2,600,518
SELF-LEVELING SUPPORTING DEVICE
Filed Aug. 18, 1948      2 SHEETS—SHEET 2
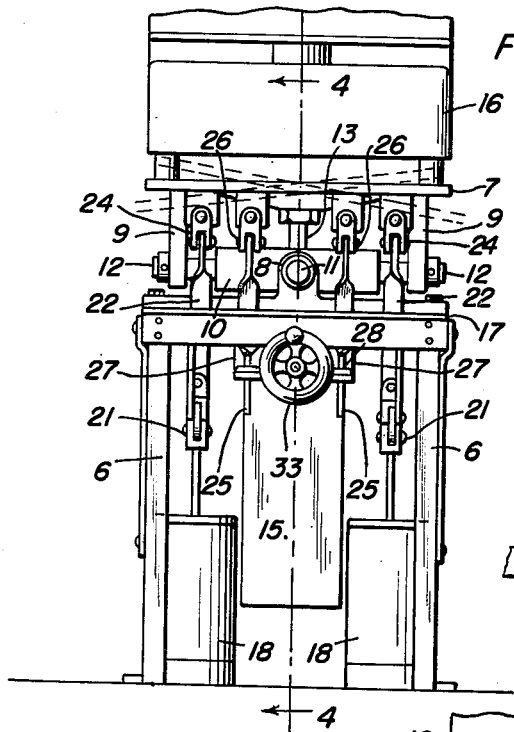
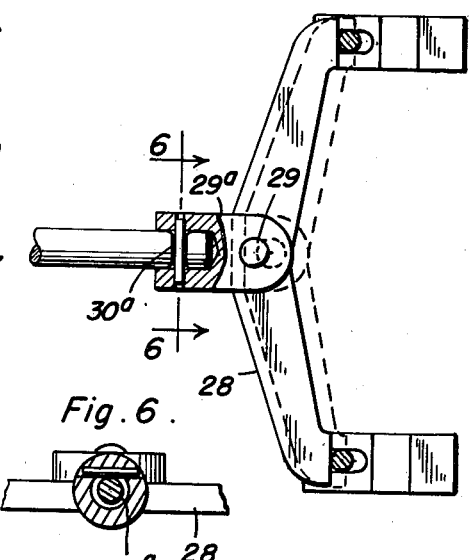
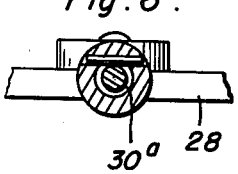
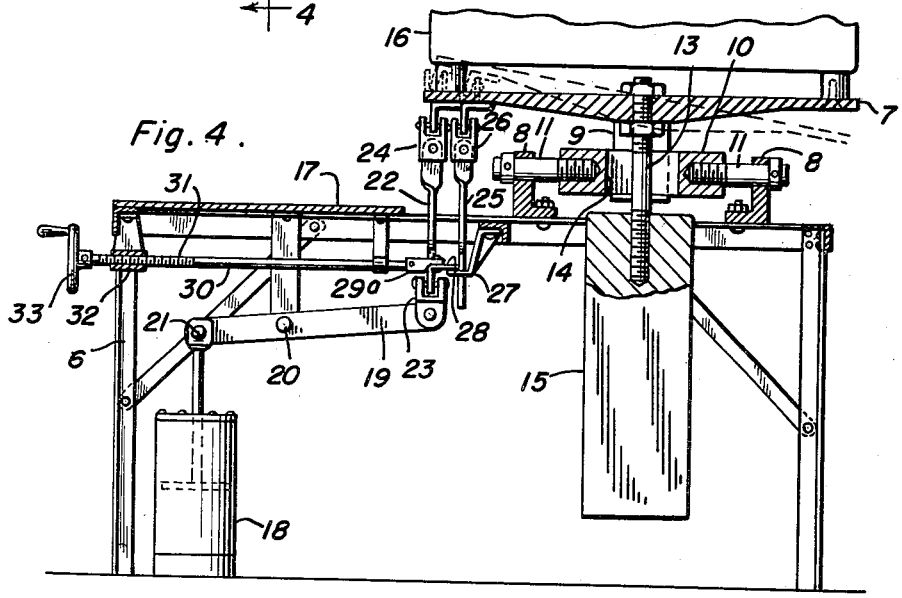
Norman S. Ruth
INVENTOR.

Patented June 17, 1952

2,600,518

UNITED STATES PATENT OFFICE 2,600,518

SELF-LEVELING SUPPORTING DEVICE

Norman S. Ruth, Perkasie, Pa.

Application August 18, 1948, Serial No. 44,957

3 Claims. (Cl. 248—180)

This invention relates to a self leveling device for supporting objects on structures which repeatedly tilt in different directions to various slanting positions.

The present device is primarily designed for supporting a platform scale on a truck or like vehicle, and for automatically maintaining the scale in a level or horizontal position so that said scale will properly function and may be satisfactorily used for weighing merchandise carried by and sold from the vehicle.

The primary object of the present invention is to provide a self leveling supporting device of the above kind which is comparatively simple in construction and highly efficient in operation.

Another object is to provide a supporting device of the above kind including a supporting frame, a platform arranged above and mounted upon said frame for free substantially universal tilting movement relative to the latter and adapted to have the scale or other object placed thereon, a pendulum fixed to and depending from said platform to automatically maintain the latter level regardless of various tilting movements of the frame, and novel means for damping relative movements between the frame and the platform with its pendulum, so as to prevent prolonged swinging movement of said platform and its pendulum.

Another object is to provide novel means for locking the platform and frame against relative tilting movement after the vehicle or like structure has been stopped or has come to rest and the platform has assumed a level position.

With the above and other objects in view, the present invention consists of a novel form, combination and arrangement of parts hereinafter more fully described, and shown in the accompanying drawings and claimed.

In the drawings:

Figure 3 is a front elevational view, partly broken away;

Figure 4 is a fragmentary vertical longitudinal section taken on line 4—4 of Figure 3;

Figure 5 is an enlarged fragmentary view, partly in plan partly in section, showing details of the means for locking the platform and frame against relative tilting movement;

Figure 6 is a fragmentary transverse section taken on line 6—6 of Figure 5.

Figure 1:
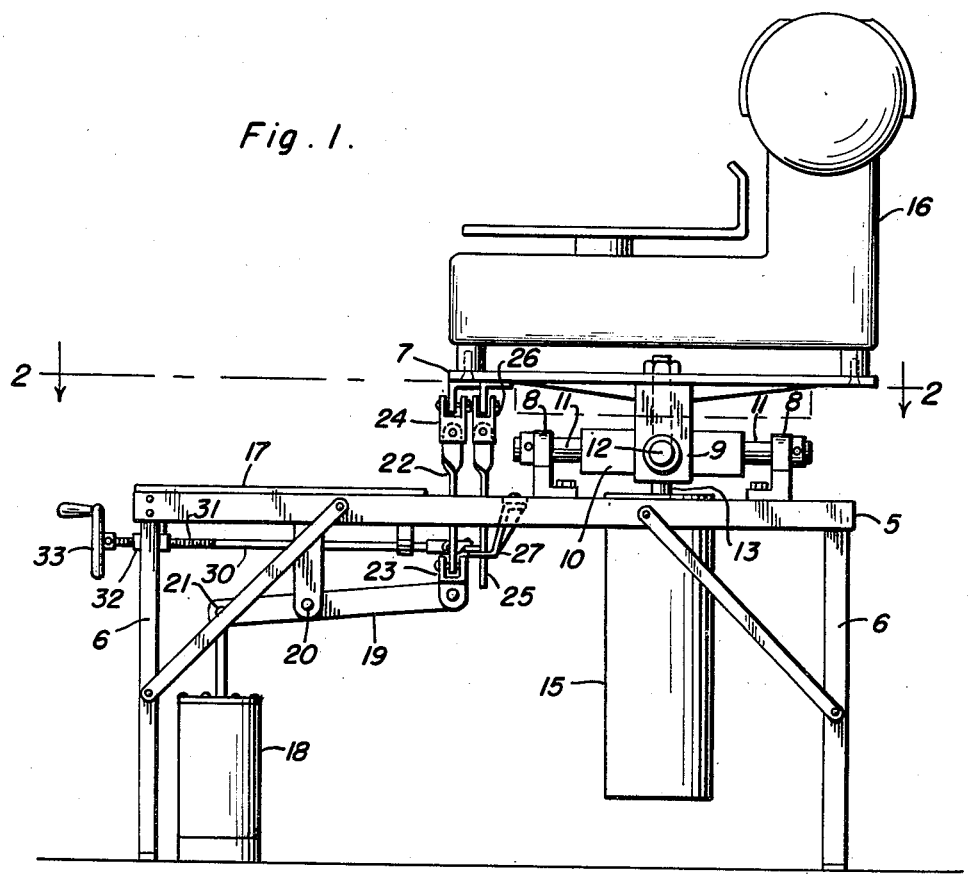
Figure 1 is a side elevational view of a supporting device constructed in accordance with the present invention and having a platform scale of the computing type mounted upon the platform thereof.
Figure 2:
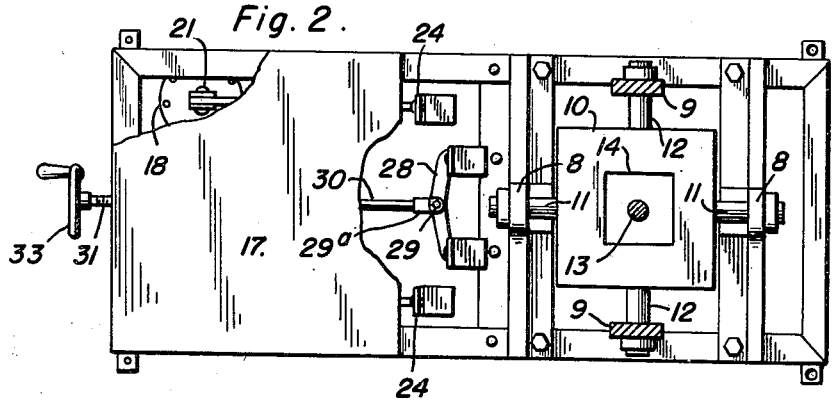
Figure 2 is a horizontal section taken on line 2—2 of Figure 1, partly broken away.

Referring in detail to the drawings, 5 indicates an elongated rectangular frame supported in an elevated position by means of braced corner legs 6 adapted to be secured to the vehicle or other structure on which the device is used. A platform 7 is disposed above the rear end of frame 5 and is mounted upon the latter for substantially universal tilting movement relative thereto. For the latter purpose, opposed front and rear bearing brackets 8 are fixed upon the frame 5 midway between the sides thereof, a pair of opposed bearing brackets 9 are rigid with and depend from the platform 7 midway between the front and rear of the latter, and a rectangular plate 10 has aligned forwardly and rearwardly projecting pintles 11 journalled in the brackets 8 and aligned laterally projecting pintles 12 on which the brackets 9 are journalled. Thus, the platform 7 and plate 10 can tilt laterally in either direction about the axes of pintles 11, and platform 7 and brackets 9 can tilt forwardly or rearwardly about the axes of pintles 12. Fixed to the center of and depending from the platform 7 is a pendulum composed of a stem 13 attached to the platform 7 and freely extending downwardly through a large central opening 14 in plate 10, and a weight 15 attached to the lower end of said stem 13. Accordingly, the pendulum will automatically maintain the platform 7 level regardless of changes in the position of frame 5 due to inclination or unevenness of the road or the like. As shown a conventional computing or other platform scale 16 may be secured on the platform 7 so as to be automatically maintained in a level position with the platform 7. A top member or plate 17 may be provided on the front portion of frame 5 so that such portion may be used as a table.

Two dash pots 18 are mounted beneath and at opposite sides of the front end of frame 5, and the upwardly projecting piston rods of these dash pots are operatively connected to the front of platform 7 at opposite sides of the axes defined by pintles 11, so as to damp the tilting movements of said platform and the scale or other object 16 mounted thereon. Each operative connection consists of a lever 19 pivoted intermediate its ends to and beneath the frame 5 at 20 and pivoted at its forward end at 21 to the piston rod of one of the dash pots, and a link 22 having its lower end connected by a universal joint 23 to the rear end of lever 19 and having its upper end connected by a similar joint 24 to the platform 7.

Thus, these connections do not interfere with the universal relative movement between the frame 5 and the platform 7.

Means is provided to lock the platform 7 against movement relative to frame 5 and to thereby secure said platform in a level position when using the scale 16 or the like after the vehicle or other structure on which the device is used has been parked or has come to rest. For this purpose, depending bars 25 are suspended by universal joints 26 from the front of platform 7 at opposite sides of the axes formed by pintles 11, and these bars extend freely through the lower ends of brackets 27 carried by frame 5, a manually operable device being provided to fix the rods against movement through or relative to the brackets 27 when desired. This manually operable device consists of a cross bar 28 pivoted intermediate its ends at 29 to a head 29a in which the rear end of a suitably guided adjusting rod 30 is swivelled at 30a, said rod 30 being disposed longitudinally of and beneath the frame 5 and having a screw threaded portion 31 which extends through and has threaded engagement in a nut 32 mounted on and beneath the front end of frame 5. The ends of cross bar 28 engage the bars 25 so that when the rod 30 is adjusted rearwardly, the bars 25 are clamped between said ends of bar 28 and the brackets 27. An operating handle 33 is secured on the front end of rod 30, and it will be apparent that bars 25 may be released by adjusting the rod 30 forwardly.

In use, the frame 5 will move with the vehicle or like structure on which the device is mounted, as said vehicle or like structure moves in different directions from the horizontal. However, the pendulum 13, 15 will tend to remain in an upright position so as to keep the platform 7 and object 16 level. Any tendency of the platform 7, object 16 and pendulum 13, 15 to vibrate for a prolonged period, due to sudden changes in the direction or speed of movement of the vehicle or like structure, will be opposed by the dash pots 18. When movement of the vehicle or like structure has ceased, the platform 7 and object 16 may be secured in a level position by locking the bars 25 against movement relative to brackets 27, so that use of the scale or object 16 will not disturb its level position.

From the foregoing description, it is believed that the construction, operation and advantages of the present invention will be readily understood and appreciated by those skilled in the art. It will be apparent that the invention is susceptible of modification and changes in details of construction without departing from the spirit and scope of the invention as claimed.

Having described the invention, what is claimed as new is:

1. In a self leveling scale supporting device, a platform adapted to have a scale secured thereon, a frame, means mounting said platform on and above said frame for substantially universal movement including a rockable plate having a large central opening, a pendulum having a stem centrally passing through said opening and fixed to and depending from said platform, means for damping movement of said platform, and manually operable means for locking the platform against movement relative to the frame, said manually operable means including guide brackets fixed to the frame, horizontally spaced bars universally pivoted on the platform and depending therefrom at opposite sides of its lateral tilting axis and freely extending through the guide brackets, and a manually operable device carried by and disposed beneath the frame and having a cross bar engaging and clamping said bars against movement through said guide brackets when the rod is in one position.

2. In a self leveling supporting device, a platform, a frame, means mounting said platform on and above said frame for substantially universal movement including a rockable plate having a large central opening, a pendulum having a stem centrally passing through said opening and fixed to and depending from said platform, means for damping movement of said platform including a pair of dash pots having cylinders rigidly mounted beneath said frame and pistons having rods operatively connected to the platform, the operative connection between the piston rod of each dash pot and the platform including a lever connected at one end to the piston rod, and a link having a universal connection at its lower end with the lever and a universal connection at its upper end with the platform.

3. In a self leveling supporting device, an elongated platform, a frame, means mounting said platform on and above the rear end portion of said frame for substantially universal movement including a rockable plate having a large central opening, a top member mounted on the forward end portion of said frame, a pendulum having a stem centrally passing through said opening and fixed to and depending from said platform, means for damping movement of said platform including a pair of dash pots having cylinders rigidly mounted beneath the forward portion of said frame and pistons having rods operatively connected to the platform, the operative connection between the piston rod of each dash pot and the platform including a lever connected at one end to the piston rod, and a vertical link having a universal connection at its lower end with the lever and a universal connection at its upper end with the platform.

NORMAN S. RUTH.

REFERENCES CITED

The following references are of record in the file of this patent:

UNITED STATES PATENTS

| Number | Name | Date |
|---|---|---|
| 622,045 | Hein | Mar. 28, 1899 |
| 705,731 | Ach | July 29, 1902 |
| 1,623,427 | Manrock | Apr. 5, 1927 |
| 1,689,624 | Eskilson et al. | Oct. 30, 1928 |
| 2,439,067 | Wood | Apr. 6, 1948 |